(12) United States Patent
Vennestrøm et al.

(10) Patent No.: US 11,667,536 B2
(45) Date of Patent: Jun. 6, 2023

(54) METHOD FOR THE PREPARATION OF A MOLECULAR SIEVE OF THE CHA-TYPE

(71) Applicant: Umicore AG & Co. KG, Hanau-Wolfgang (DE)

(72) Inventors: Peter Nicolai Ravnborg Vennestrøm, Virum (DK); Nuria Martin Garcia, Heverlee (BE); Manuel Moliner Marin, Valencia (ES); Avelino Corma Canos, Valencia (ES)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 17/268,750

(22) PCT Filed: Aug. 23, 2019

(86) PCT No.: PCT/EP2019/072595
§ 371 (c)(1),
(2) Date: Feb. 16, 2021

(87) PCT Pub. No.: WO2020/039074
PCT Pub. Date: Feb. 27, 2020

(65) Prior Publication Data
US 2022/0112087 A1  Apr. 14, 2022

(30) Foreign Application Priority Data

Aug. 24, 2018 (EP) ...................... 8190856

(51) Int. Cl.
*C01B 39/48* (2006.01)
*B01J 29/72* (2006.01)
*B01J 35/00* (2006.01)
*F01N 3/20* (2006.01)

(52) U.S. Cl.
CPC ............ *C01B 39/48* (2013.01); *B01J 29/723* (2013.01); *B01J 35/0006* (2013.01); *F01N 3/2066* (2013.01); *B01J 2229/186* (2013.01); *F01N 2370/04* (2013.01); *F01N 2570/14* (2013.01)

(58) Field of Classification Search
CPC ........ C01B 39/48; C01B 39/04; B01J 29/723; B01J 29/7015; B01J 2229/183; B01J 2229/186; B01J 2229/64; B01J 35/0006; B01J 29/763; B01J 37/0211; B01J 37/031; B01J 37/10; F01N 3/2066; F01N 2370/04; F01N 2570/14; B01D 53/9477; B01D 2255/50; B01D 2257/404; B01D 2258/012; B01D 53/9418
USPC ........... 423/702, 703, 704, 709, 713; 502/74
See application file for complete search history.

(56) References Cited

U.S. PATENT DOCUMENTS

| | | |
|---|---|---|
| 3,030,181 A | 4/1962 | Milton et al. |
| 3,832,449 A | 8/1974 | Rosinski et al. |
| 4,188,364 A | 2/1980 | Gladden |
| 4,440,871 A | 4/1984 | Lok et al. |
| 4,544,538 A | 10/1985 | Zones |
| 5,026,532 A | 6/1991 | Gaffney et al. |
| 7,645,718 B2 | 1/2010 | Li et al. |
| 8,007,764 B2 | 8/2011 | Miller |
| 8,293,198 B2 | 10/2012 | Beutel et al. |
| 8,883,119 B2 | 11/2014 | Bull et al. |
| 2004/0138051 A1 | 7/2004 | Shan et al. |
| 2008/0045767 A1 | 2/2008 | Cao et al. |
| 2008/0075656 A1 | 3/2008 | Zones |
| 2008/0159951 A1 | 3/2008 | Miller et al. |
| 2009/0018379 A1* | 1/2009 | Cao .................... B01J 29/83 423/704 |
| 2011/0020204 A1 | 1/2011 | Bull et al. |
| 2011/0182790 A1 | 7/2011 | Chandler et al. |
| 2011/0312486 A1 | 12/2011 | Yilmaz et al. |
| 2013/0251611 A1 | 9/2013 | Wen |
| 2013/0323164 A1 | 12/2013 | Feyen et al. |
| 2014/0140921 A1 | 5/2014 | Burton et al. |
| 2015/0151287 A1 | 6/2015 | Rivas-Cardona |
| 2016/0271596 A1 | 9/2016 | Marin |
| 2018/0079650 A1 | 3/2018 | Corma Canos |
| 2018/0127282 A1* | 5/2018 | Corma Canós ....... C01B 39/026 |
| 2018/0304242 A1* | 10/2018 | Martens .............. B01J 29/7607 |
| 2019/0060885 A1 | 2/2019 | Welsch |
| 2019/0203625 A1 | 7/2019 | Schuler |
| 2019/0248663 A1 | 8/2019 | Corma Canos |
| 2019/0248664 A1 | 8/2019 | Corma Canos |
| 2019/0248665 A1 | 8/2019 | Corma Canos |
| 2019/0248666 A1 | 8/2019 | Corma Canos |
| 2019/0256366 A1 | 8/2019 | Corma Canos |
| 2019/0368399 A1 | 12/2019 | Schuler |

FOREIGN PATENT DOCUMENTS

| | | |
|---|---|---|
| CN | 103118981 A | 5/2013 |
| CN | 104108726 A | 10/2014 |
| EP | 1992409 A1 | 11/2008 |

(Continued)

OTHER PUBLICATIONS

Martin et al., "High yield synthesis of high-silica chabazite by combining the role of zeolite precursors and tetraethylammonium: SCR of NOx", Chem. Commun., 2015, 51, pp. 9965-9968.*
International Search Report received in PCT/EP2019/072595, dated Sep. 19, 2019.
Written Opinion received in PCT/EP2019/072595, dated Sep. 19, 2019.
Concepcion, et al., "Preparation and characterization of Mg-containing AFI and chabazite-type materials", Jan. 1996, pp. 56-64, vol. 16, No. 1, Publisher: Zeolites.

(Continued)

*Primary Examiner* — Elizabeth D Wood
(74) *Attorney, Agent, or Firm* — Suzannah K. Sundby, Esq.; Canady + Lortz LLP

(57) ABSTRACT

The present invention relates to a method for the preparation of a molecular sieve of the CHA-type as well as catalytic applications thereof.

10 Claims, No Drawings

(56) References Cited

FOREIGN PATENT DOCUMENTS

| | | | |
|---|---|---|---|
| EP | 3381865 | A1 | 10/2018 |
| GB | 868846 | A | 5/1961 |
| JP | 3436567 | | 8/2003 |
| JP | 2012096956 | A | 5/2012 |
| RU | 2445166 | A | 5/2011 |
| RU | 2011119436 | A | 11/2012 |
| WO | 2010114996 | A2 | 10/2010 |
| WO | 2011046621 | | 4/2011 |
| WO | 2011064186 | A1 | 6/2011 |
| WO | 2013035054 | A1 | 3/2013 |
| WO | 2013182974 | A1 | 12/2013 |
| WO | WO 2014/090698 | * | 6/2014 |
| WO | 2015154828 | | 10/2015 |
| WO | 2016096653 | | 6/2016 |
| WO | 2018086976 | | 5/2018 |

OTHER PUBLICATIONS

Takura et al., "Synthesis of high-silica CHA type zeolite by interzeolite conversion of FAU type zeolite in the presence of seed crystals", Mar. 24, 2011, pp. 91-96, vol. 144, No. 1-3, Publisher: Microporous and Mesoporous Materials.

Takura, et al., "Synthesis of High-silica CHA Zeolite from FAU Zeolite in the Presence of Benzyltrimethylammonium Hydroxide", Jul. 26, 2008, pp. 908-909, vol. 37, No. 9, Publisher: Chemistry Letters.

Limin, et al., "Designed copperamine complex as an efficient template for one-pot synthesis of Cu—SSZ-13 zeolite with excellent activity for selective catalytic . . . ", May 31, 2011, pp. 9789-9791, vol. 47, Publisher: Chem. Commun.

Yamanaka et al., "Acid stability evaluation of CHA-type zeolites synthesized by interzeolite conversion of FAU-type zeolite and their membrane application . . . ", Mar. 23, 2012, pp. 141-147, vol. 158, Publisher: Microporous and Mesoporous Materials.

* cited by examiner

METHOD FOR THE PREPARATION OF A MOLECULAR SIEVE OF THE CHA-TYPE

FIELD OF THE INVENTION

The present invention relates to a method for the preparation of a molecular sieve of the CHA-type as well as to a molecular sieve of the CHA-type obtainable by the respective method. Various uses of the molecular sieve of the CHA-type in catalytic applications are also envisaged.

BACKGROUND OF THE INVENTION

Zeolites are crystalline microporous materials formed by corner-sharing $TO_4$ tetrahedra (T=Si, Al, P, Ge, B, Ti, Sn, etc.), interconnected by oxygen atoms to form pores and cavities of uniform size and shape precisely defined by their crystal structure. Zeolites are also denoted "molecular sieves" because the pores and cavities are of similar size as small molecules. This class of materials has important commercial applications as absorbents, ion-exchangers and catalysts.

Molecular sieves are classified by the International Zeolite Association (IZA) according to the rules of the IUPAC Commission on Molecular Sieve Nomenclature. Once the topology of a new framework is established, a three letter code is assigned. This code defines the atomic structure of the framework, from which a distinct X-ray diffraction pattern can be described.

There are a large number of molecular sieve structures known today. Some known molecular sieves belong to certain families of structures with similar features. One specific family, the ABC-6 family, can be described as a stacking of two-dimensional periodic layers of non-connected planar 6-ring motifs, made up from 6 T-atoms (T=Si, Al etc.) connected by oxygen atoms. The resulting layer with hexagonal symmetry is also called the periodic building unit (PerBU). The stacking is typically described by a sequence of letters "A", "B" and "C" that indicates the relative positions of neighboring layers. "A", "B" and "C" refers to the well-known relative positions of neighboring layers when stacking hexagonal layers of close packed spheres.

The CHA framework belongs to the ABC-6 family and can be described by a repeating stacking sequence of AABBCC. This leads to a framework topology characterized by a three-dimensional 8-membered-ring pore systems containing double-six-rings (d6R) and cha cages.

WO 2016/096653 describes the synthesis of a zeolite having a CHA crystal structure. The synthesis mixture which is employed contains zeolite Y as a starting material which incurs high costs.

WO 2018/086976 refers to a method for the preparation of a molecular sieve belonging to the ABC-6 framework family with disorder in the ABC stacking sequence. The methods disclosed in this document are specifically suitable for preparing molecular sieve with a stacking disorder but not for pure or essentially pure CHA.

In view of the above it was an object of the present invention to provide a method for the preparation of a molecular sieve of the CHA-type which is most cost- and time-effective.

SUMMARY OF THE INVENTION

In one embodiment, the present invention relates to a method for the preparation of a molecular sieve of the CHA-type, wherein the method comprises the steps of:

(i) preparing a synthesis mixture comprising
   (a) a non-molecular sieve source of silicon and/or a non-molecular sieve source of aluminum;
   (b) an organic structure directing agent (OSDA);
   (c) water;
   (d) optionally a crystalline molecular sieve containing six-ring structural features; and
   (e) optionally an alkali or alkaline earth hydroxide (A);
   in molar ratios of
   $SiO_2/Al_2O_3$ about 8 to about 60
   $OSDA/SiO_2$ about 0.01 to about 1.0
   water/$SiO_2$ about 2 to about 200
   A/$SiO_2$ 0 to about 1.0;
   wherein the molar ratio of (the total amount of non-molecular sieve source of silicon and non-molecular sieve source of aluminum) to (crystalline molecular sieve containing six-ring structural features) is in the range of 100/0 to about 5/95;
(ii) subjecting the mixture to conditions capable of crystallizing the molecular sieve of the CHA-type; and
(iii) separating the molecular sieve of the CHA-type.

In another embodiment, the present invention relates to a molecular sieve of the CHA-type which is obtainable by the method of the present invention.

In a further embodiment, the present invention is directed to a process for the removal of NOx from automotive combustion exhaust gases, wherein the molecular sieve of the CHA-type of the present invention is used as the SCR catalytically active material for the conversion of NOx.

Yet another embodiment of the invention refers to a catalyzed substrate monolith comprising an SCR catalytically active material for the conversion of NOx for use in treating automotive combustion exhaust gases, wherein the SCR catalytically active material for the conversion of NOx is the molecular sieve of the CHA-type of the present invention.

An exhaust gas purification system comprising a particulate filter coated with an SCR catalyst comprising the molecular sieve of the CHA-type of the present invention is also the subject-matter of the present invention.

A further embodiment relates to an exhaust gas purification system comprising a PNA catalyst, wherein the PNA catalytically active material comprises the molecular sieve of the CNA-type of the present invention and at least one platinum group metal selected from ruthenium, rhodium, palladium, osmium, iridium, platinum and mixtures thereof.

Another embodiment refers to an exhaust gas purification system comprising an ASC catalyst, wherein the ASC catalytically active material comprises the molecular sieve of the CHA-type of the present invention and at least one platinum group metal selected from ruthenium, rhodium, palladium, osmium, iridium, platinum and mixtures thereof.

DETAILED DESCRIPTION OF THE INVENTION

In the method of the present invention a molecular sieve of the CHA-type is prepared. The molecular sieve of the CHA-type can be pure CHA or a molecular sieve which contains CHA as well as other molecule sieves. The amount of the CHA in the molecular sieve containing CHA is typically about 90 to about 100 wt.-%, about 95 to about 100 wt.-%, about 96 to about 100 wt.-%, preferably about 98 to about 100 wt.-%, more preferably about 99 to about 100 wt.-%.

The other molecular sieve which can be contained is not particularly limited and will depend on the employed reaction conditions. Examples of the other molecular sieve include FAU, MOR, BEA, GME, ANA, LEV or mixtures thereof. The other molecular sieve can be present, e.g., as an intergrowth or in admixture with CHA.

As regards the present invention, it is useful to discuss the specific framework topologies CHA and GME. The CHA and GME framework topologies are both well-defined ordered structures belonging to the ABC-6 family. The CHA framework topology can be described by the stacking sequence AABBCC and is a small-pore material characterized by a three-dimensional 8-membered-ring pore systems containing double-six-rings (d6R) and cha cages. The GME framework topology can be described as a stacking sequence of AABB and is a large-pore material characterized by 12-membered-ring channels in one dimension and 8-membered ring pore systems in the other two dimensions containing double-six-rings (d6R) and gme cages.

Any finite sequence of A, B and C layers, stacked periodically, forms an ordered structure with well-defined unit cells in all three spatial dimensions. Any non-periodic mistake in the stacking sequence will lead to a disordered structure without a well-defined periodic unit cell in the direction normal to the layers. When sufficient stacking disorder occurs, the material can no longer be considered the same framework topology as the ordered framework. As a consequence of disorder in the ABC-6 sequence, different local topological features arise such as a distribution of different cage-sizes that are completely different to the ordered parent framework topology. This will lead to different adsorption, diffusion and material properties, e.g catalytic properties.

As an example, CHA and GME topologies both consist of a sequence of double 6-ring layers. Each layer is shifted ⅓ of the periodicity relative to the previous layer. In case of CHA the ⅓ shift consistently happens in the same direction, which means that after three steps the layer has shifted a full periodicity relative to the first layer. In case of GME the ⅓ shift consistently happens in alternating directions, which means that after two steps the layer is back to the original position. The simplest way of describing the amount of disorder in the CHA-GME series is to define the choice of changing stacking direction (faulting) to a simple probability. This means a faulting probability of 0% results in pure ordered CHA, while a probability of 100% results in pure ordered GME. In the following description, this specific percentage is used to describe the amount of disorder in the molecular sieve. In reality, the probability of changing stacking direction will be slightly dependent on stacking directions of previous steps, because of relaxation effects. For this reason, the above explanation using a faulting probability in its simplest form should not be used to limit the invention disclosed herein.

X-ray diffraction patterns of the stacking disordered CHA-GME series can be simulated using DIFFaX [M. M. J. Treacy, J. M. Newsam & M. W. Deem 1991 "A General Recursion Method for Calculating Diffracted Intensities From Crystals Containing Planar Faults" Proc. Roy. Soc. Lond. A433, 499-520], available from [http://www.public.asu.edu/~mtreacy/DIFFaX.html]. The simulated patterns can be used for comparison with experimentally measured X-ray diffraction data to elucidate the approximate amount of disorder in prepared materials. As mentioned above, a faulting probability of 0% corresponds to pure CHA while a faulting probability of 100% corresponds to pure GME. When stacking disorder occurs, the material cannot be described by a single well-defined unit cell and it is therefore non-periodic in one or more dimensions. Herein, this type of material is referred as disordered materials, or as materials with disorder in the stacking sequence. Materials of this type are well-known to a person skilled in the art and are often also referred to as intergrowth structures. Specifically, materials belonging to the stacking disordered CHA-GME series are often also be described as inter-growths of the two end-member framework topologies.

Simulated XRPD patterns from DIFFaX of the stacking disordered CHA-GME series as well as XRPD patterns actual samples are shown in WO 2018/086976.

In the molecular sieves which are prepared according to the method of the present invention, the comparable faulting probability or amount of stacking disorders is up to 4%, more preferably up to 2%, even more up to 1%.

In step (i) a synthesis mixture comprising
(a) a non-molecular sieve source of silicon and/or a non-molecular sieve source of aluminum;
(b) an organic structure directing agent (OSDA);
(c) water;
(d) optionally a crystalline molecular sieve containing six-ring structural features; and
(e) optionally an alkali or alkaline earth hydroxide (A)
is prepared.

The non-molecular sieve source of silicon is not particularly limited as long as it is not a molecular sieve. The non-molecular sieve source of silicon is typically amorphous or the non-molecular sieve source of silicon is provided in the form of a solution or gel. Examples of the non-molecular sieve source of silicon include silica, fumed silica, silicic acid, silicates, colloidal silica, tetraalkyl orthosilicates and mixtures thereof. Preferably the non-molecular sieve source of silicon is a silicate, or an amorphous silica.

The non-molecular sieve source of aluminum is not particularly limited as long as it is not a molecular sieve. The non-molecular sieve source of aluminum is typically amorphous or an aluminum salt. Examples of the non-molecular sieve source of aluminum include alumina, boehmite, aluminum hydroxide, aluminates and mixtures thereof. Examples of the aluminum salt include aluminum nitrate and aluminum sulfate. Preferably the non-molecular sieve source of aluminum is selected from aluminium nitrate, aluminium sulfate, aluminium hydroxide, aluminate or alumina, more preferably amorphous alumina or aluminates.

It is possible to employ a non-molecular sieve source of silicon with a non-molecular sieve source of aluminum. However, it is most preferable to use a non-molecular sieve starting material which is a source of both silicon and aluminum. The non-molecular sieve starting material which is a source of both silicon and aluminum is not particularly limited as long as it is not a molecular sieve. The non-molecular sieve starting material which is a source of both silicon and aluminum is typically amorphous. Examples of suitable non-molecular sieve sources of silicon and aluminum include precipitated silica-alumina, amorphous silica-alumina, kaolin, amorphous mesoporous materials and mixtures thereof, preferably amorphous silica-alumina.

In a further preferred embodiment, the synthesis mixture contains a non-molecular sieve source of silicon, a crystalline molecular sieve containing six-ring structural features and optionally a non-molecular sieve source of aluminum because in this manner a molecular sieve of the CHA-type which has a higher mole ratio of silica to alumina than the crystalline molecular sieve containing six-ring structural features can be provided.

The molar amount of silicon introduced by the non-molecular sieve source of silicon is preferably in the range of about 20 to about 100 mol % of the total amount of silicon which is present in the synthesis mixture, preferably about 40 to about 100 mol %, more preferably about 40 to about 80 mol %.

The molar amount of aluminum introduced by the non-molecular sieve source of aluminum is preferably in the range of about 0 to about 100 mol % of the total amount of aluminum which is present in the synthesis mixture, preferably about 0 to about 70 mol %.

The synthesis mixture contains sources of silica and alumina, so that the molar ratio of $SiO_2/Al_2O_3$ is in the range of about 8 to about 60, preferably about 10 to about 50, more preferably about 15 to about 40. The amount of $SiO_2$ is calculated from the amount of silicon contained in the non-molecular sieve source of silicon and the amount of silicon contained in the crystalline molecular sieve containing six-ring structural features and then calculating the molar amount of $SiO_2$. The amount of $Al_2O_3$ is calculated from the amount of aluminum contained in the non-molecular sieve source of aluminum and the amount of aluminum contained in the crystalline molecular sieve containing six-ring structural features and then calculating the molar amount of $Al_2O_3$.

The synthesis mixture further contains an organic structure directing agent (OSDA). The OSDA can be any suitable compound such as a cation having the formula $[NR^1R^2R^3R^4]^+$, in which $R^2$, $R^3$, and $R^4$ are independently alkyl groups with one to four carbon atoms. The alkyl group can be optionally substituted by one or more hydroxy groups. In a preferred embodiment, all four of the R-groups are alkyl groups having one to four carbon atoms and at least two of the alkyl groups have two to four carbon atoms. The alkyl groups are preferably linear but branched alkyl groups can also be employed. Examples of alkyl groups with one to four carbon atoms include methyl, ethyl, n-propyl, iso-propyl, n-butyl, iso-butyl, sec-butyl or tert-butyl. Preferred are methyl, ethyl, n-propyl, and n-butyl. Examples of possible OSDAs include tetraethylammonium, methyltriethylammonium, propyltriethylammonium, diethyldipropylammonium, diethyldimethylammonium, trimethylethylammonium, trimethylpropylammonium, a choline cation and mixtures thereof. Preferably the OSDA is tetraethylammonium, diethyldimethylammonium, methyltriethylammonium or propyltriethylammonium, more preferably tetraethylammonium or methyltriethylammonium. In one embodiment, the OSDA is tetraethylammonium. In another embodiment, the OSDA is methyltriethylammonium.

In the prior art, trimethyladamantylammonium and trimethylbenzylammonium have been used as OSDAs for preparing molecular sieves of the CHA-type which are essentially free of stacking disorder. These molecules are very expensive. Therefore, it is an advantage of the present invention that less costly compounds can be used as OSDAs. The cost advantage is particularly pronounced because the present inventors have surprisingly found that these less expensive OSDAs can be used in combination with a non-molecular sieve source of silicon and/or non-molecular sieve source of aluminum for preparing a CHA molecular sieve essentially free of stacking disorder, which further reduces the costs compared to prior art methods, which require a crystalline molecular sieve such as FAU as a starting material.

The anion of the OSDA is not particularly limited as long as it does not interfere with the formation of the molecular sieve. Examples of typical anions include, but are not limited to, hydroxide, chloride, bromide, and iodide and mixtures thereof, more typically hydroxide.

The amount of OSDA can be suitably chosen by a skilled person and is preferably in the range of about 0.01 to about 1.0, more preferably about 0.02 to about 0.5, even more preferably about 0.03 to about 0.4, based on the amount of silica (molar ratio).

Water is contained in the synthesis mixture in an amount of about 5 to about 200, preferably about 5 to about 50, more preferably about 8 to about 40, based on the amount of silica (molar ratio). Less water in the synthesis mixture gives a higher solid yield and therefore also reduces cost (higher throughput). Furthermore, less water typically leads to faster crystallization due to the higher concentrations.

The synthesis mixture can optionally contain a crystalline molecular sieve containing six-ring structural features. In one embodiment, the crystalline molecular sieve containing six-ring structural features is present. In an alternative embodiment, the crystalline molecular sieve containing six-ring structural features is not present. Suitable examples of the crystalline molecular sieve containing six-ring structural features include FAU, LTL, GME, LEV, AEI, LTA, OFF, CHA and ERI and mixtures thereof. Preferably the crystalline molecular sieve containing six-ring structural features is selected from FAU, LTA and mixtures thereof, more preferably FAU.

The molar ratio of (the total amount of non-molecular sieve source of silicon and non-molecular sieve source of aluminum) to (crystalline molecular sieve containing six-ring structural features) is in the range of 100/0 to about 5/95. This means that either a non-molecular sieve source of silicon or a non-molecular sieve source of aluminum or both have to be present in the synthesis mixture in the above identified amounts.

The upper limit of the range of the molar ratio of (the total amount of non-molecular sieve source of silicon and non-molecular sieve source of aluminum) to (crystalline molecular sieve containing six-ring structural features) can be 100/0, preferably about 99/1, preferably about 98/2, preferably about 97/3, preferably about 95/5, preferably about 90/10, preferably about 85/5, preferably about 80/20. The lower limit of the range of the molar ratio of (the total amount of non-molecular sieve source of silicon and non-molecular sieve source of aluminum) to (crystalline molecular sieve containing six-ring structural features) can be about 5/95, preferably about 10/90, preferably about 20/80, preferably about 30/70, preferably about 40/60, preferably about 50/50. Any combinations of the above mentioned upper limits and lower limits are also envisaged.

Preferred ranges include, for instance, about 100/0 to about 10/90, preferably about 100/0 to about 20/80, preferably about 100/0 to about 30/70, preferably about 100/0 to about 40/60, preferably about 100/0 to about 50/50.

Further preferred ranges include, for instance, about 95/5 to about 10/90, preferably about 95/5 to about 20/80, preferably about 95/5 to about 30/70, preferably about 95/5 to about 40/60, preferably about 95/5 to about 50/50.

The molar ratio of (the total amount of non-molecular sieve source of silicon and non-molecular sieve source of aluminum) to (crystalline molecular sieve containing six-ring structural features) can be calculated by using the following formula $$(\text{mol Al}_{non-ms} + \text{mol Si}_{non-ms})/(\text{mol Al}_{zeo} + \text{mol Si}_{zeo})$$

wherein mol $Al_{non-ms}$ mol of aluminum in the non-molecular sieve source of aluminum mol $Si_{non-ms}$ mol of silicon in the non-molecular sieve source of silicon mol $Al_{zeo}$ mol of aluminum in the crystalline molecular sieve containing six-ring structural features mol $Si_{zeo}$ mol of silicon in the crystalline molecular sieve containing six-ring structural features Crystalline molecular sieves are typically expensive starting materials, particularly if they have a high SAR. As was mentioned above, it is an advantage of the present invention that it is possible to use a cheap non-molecular sieve source of silicon and/or non-molecular sieve source of aluminum as a starting material in order to reduce the production costs. In an alternative embodiment, it is possible to use a less expensive molecular sieve such as a molecular sieve with a low SAR in combination with appropriates amounts of non-molecular sieve source of silicon and optionally non-molecular sieve source of aluminum as a starting material to provide a molecular sieve having a higher SAR as an end product. In this manner the SAR can be easily adapted in a cost-effective manner to the desired value.

The silica-alumina ratios (SAR) of the synthesis mixture are not particularly limited, preferably the silica-alumina ratio is less than 25, more preferably 20 or less, and even more preferably from 8 to 20.

The synthesis mixture can furthermore optionally contain an alkali or alkaline earth hydroxide (A) such as an alkali metal hydroxide, an alkaline earth metal hydroxide or mixtures thereof. In a preferred embodiment, the alkali or alkaline earth hydroxide (A) is an alkali metal hydroxide such as sodium hydroxide. In a most preferred embodiment, the alkali or alkaline earth metal is sodium.

The molar ratio of the alkali or alkaline earth hydroxide (A) to silica is 0 to about 1.0, preferably 0 to about 0.5, more preferably 0 to about 0.3. In another preferred embodiment, the molar ratio of the alkali or alkaline earth hydroxide (A) to silica is 0 to about 0.25, more preferably 0 to about 0.2, and most preferably 0 to less than 0.2.

The present inventors have also found that the ratio of total hydroxide to silica should be preferably below or equal to about 0.6, preferably below or equal to about 0.5, in the synthesis mixture in order to ensure that a low amount of stacking disorder is observed in the molecular sieve of the CHA-type. In another preferred embodiment, the ratio of total hydroxide to silica is about 0.4 or less, more preferably less than 0.4. The total amount of hydroxide includes any hydroxide ions which are present in the synthesis mixture and includes, for instance, hydroxide which is provided by the non-molecular sieve source of silicon, the non-molecular sieve source of aluminum, the organic structure directing agent (OSDA), the crystalline molecular sieve containing six-ring structural features, and the alkali or alkaline earth hydroxide.

If desired, the synthesis mixture can also contain a seed crystal containing CHA in order to improve the crystallization during step (ii). The seed crystal containing CHA is typically a pure CHA seed crystal. The amount of seed crystal is not limited and typically corresponds to 0.1 to 25 weight-% based on the total amount of silica in the synthesis mixture.

Transition metals can be included in the reaction mixture either as simple salts or as complexes that protects the transition metal from precipitation under the caustic conditions dictated by the reaction mixture. Especially, polyamine complexes are useful for protecting transition metal ions of copper and iron during preparation and can also act to direct the synthesis towards specific molecular sieves (see for example the use of polyamines in combination with copper ions in US Patent application 2016271596). In such a way transition metal ions can be introduced into the interior of the molecular sieve already during crystallization. In one embodiment of the present invention, the reaction mixture can further comprise copper tetraethylene pentamine (Cu-TEPA) in order to introduce copper into the interior of the molecular sieve during crystallization. Preferably, the molar ratio of Cu-TEPA and the OSDA, which is a cation having the formula $[NR^1R^2R^3R^4]^+$ as described above, is about 0.01 to 1.0 to about 0.05 to 1.0.

The synthesis mixture can also contain inexpensive pore-filling agents that can help in the preparation of more siliceous products. Such pore-filling agents could be crown-ethers, simple amines and other uncharged molecules. The amounts are not particularly limited and can range from 0 to about 1, preferably 0 to about 0.5 based on silica (mol/mol).

Crystallization of the reaction mixture to form the molecular sieve is performed at elevated temperatures until the molecular sieve is formed. Hydrothermal crystallization is usually conducted in a manner to generate an autogenous pressure. The temperature can be from about 100 to about 200° C., preferably about 110 to about 175° C., more preferably about 120 to about 165° C. The crystallization time can range from about 2 hours to about 50 days, preferably from about 2 hours to about 20 days, more preferably about 1 day to about 14 days, even more preferably about 1 days to about 7 days. The reaction mixture can be subjected to stirring during the crystallization.

Once the crystallization has been completed the resulting solid molecular sieve product is separated from the remaining liquid reaction mixture by conventional separation techniques such as decantation, (vacuum-)filtration or centrifugation. The recovered solids are then typically rinsed with water and dried using conventional methods (e.g. heating to about 75° C. to 150° C., vacuum drying or freeze-drying etc.) to obtain the 'as-synthesized' molecular sieve. The 'as-synthesized' product refers to the molecular sieve after crystallization and prior to removal of the OSDAs or other organic additives.

The silica-alumina ratios (SAR) of the molecular sieve are not particularly limited, preferably the silica-alumina ratio is less than 25, more preferably 20 or less, and even more preferably from 8 to 20.

The organic molecules still retained in the as-synthesized molecular sieve are in most cases, unless used in the as-synthesized form, removed by thermal treatment in the presence of oxygen. The temperature of the thermal treatment should be sufficient to remove the organic molecules either by calcination, evaporation, decomposition, combustion or a combination thereof. Typically, a temperature from about 150 to about 750° C. for a period of time sufficient to remove the organic molecule(s) is applied. A person skilled in the art will readily be able to determine a minimum temperature and time for this heat treatment. Other methods to remove the organic material(s) retained in the as-synthesized molecular sieve include extraction, vacuum-calcination, photolysis or ozone-treatment.

Usually it is desirable to remove the remaining alkali or alkaline earth ions (e.g. Na') from the molecular sieve, e.g., by ion-exchange or other known methods. Ion-exchange with ammonium and/or hydrogen is a well recognized method to obtain the $NH_4$-form or H-form of the molecular sieve. Desired metal ions may also be included in the ion-exchange procedure or carried out separately. The $NH_4$-form of the material may also be converted to the H-form by simple heat treatment in a similar manner as described above.

In certain cases, it may also be desirable to alter the chemical composition of the obtained molecular sieve, such as altering the silica-to-alumina molar ratio. Without being bound by any order of the post-synthetic treatments, acid leaching (inorganic and organic using complexing agents such as EDTA etc. can be used), steam-treatment, desilication and combinations thereof or other methods of demetallation can be useful in this case.

To promote specific catalytic applications certain metals can be introduced into the molecular sieve to obtain a metal-substituted, metal-impregnated or metal-exchanged molecular sieve. Metal ions may be introduced by ion-exchange, impregnation, solid-state procedures and other known techniques. Metals can be introduced to yield essentially atomically dispersed metal ions or be introduced to yield small clusters or nanoparticles with either ionic or metallic character. Alternatively, metals can simply be precipitated on the surface and in the pores of the molecular sieve. In the case where nanoparticles are preferred, consecutive treatment in e.g. a reductive atmosphere can be useful. In other cases, it may also be desirable to calcine the material after introduction of metals or metal ions.

The metal which is introduced into the molecular sieve is not limited and can be chosen according to the desired use of the molecular sieve. Examples of typical metals include transition metals, preferably the metal is copper and/or iron.

Alkali, alkaline earth metal and transition metal cations can be removed from or introduced into a molecular sieve via ion exchange reactions. These ion exchange reactions are exemplarily described hereinafter for the introduction of alkali and alkaline earth metal cations and for transition metal cations, respectively. The skilled person knows how to adapt these ion exchange reactions to obtain a molecular sieve with a desired cation content. The reactions described also include steps wherein metal cations are removed via the introduction of ammonium cations, followed by thermal decomposition thereof during calcination.

Transition metals such as copper, for instance, can be introduced via ion exchange. In a first step, an ammonium exchange is performed in order to remove alkali or alkaline earth metal cations from the molecular sieve framework by replacing them with $NH_4^+$ cations. In a second step, $NH_4^+$ is replaced by transition metal cations. The copper content of the resulting transition metal-containing molecular sieve can be easily controlled via the amount of transition metal salt and the number of ion exchange procedures performed.

Methods for introducing ammonium and transition metal cations, respectively, are well known to the skilled artisan. They can be applied to the calcined molecular sieves according to the present invention without departing from the scope of the claims. For example, ammonium cations can be easily introduced via liquid ion exchange, and transition metal cations can also easily be introduced via liquid ion exchange, incipient wetness impregnation or solid state ion exchange.

Said methods are presented exemplarily hereinafter. These methods are applicable to obtain molecular sieve which are loaded a) with transition metals like copper and/or iron and/or b) with alkali and/or alkaline earth metals.

Liquid Ion Exchange

An $NH_4^+$ liquid ion exchange can be performed, for instance, at about 100° C. in an aqueous suspension under reflux conditions. 100 ml of a 0.5 M aqueous $NH_4Cl$ or $NH_4NO_3$ solution is used per 1 g of the molecular sieve.

A $Cu^{2+}$ liquid ion exchange is performed at room temperature for 20 h. 100 ml of an aqueous copper acetate $(Cu(Ac)_2)$, copper nitrate $(Cu(NO_3)_2)$ or copper chloride $(CuCl_2)$ solution per 1 g molecular sieve is used, corresponding to 0.03 g Cu per 1 g molecular sieve. This procedure can be repeated multiple times in order to achieve the desired copper content.

It is obvious for the skilled person that the transition metal to molecular sieve ratio in liquid ion exchange can be adjusted according to the desired transition metal content of the final molecular sieve. Generally spoken, aqueous solutions with higher transition metal contents yield higher transition metal-containing molecular sieves. The skilled person may, for instance, choose aqueous transition metal salt solutions having a transition metal content of 0.03 to 0.1 g transition metal per 1 g molecular sieve in order to yield transition metal-containing molecular sieves, said transition metal-containing molecular sieves having a transition metal content of from 0.1 to 10-wt.-%, calculated as transition metal oxide and based on the total weight of the molecular sieve. Which transition metal concentration per 1 g molecular sieve should be chosen and how often the procedure shall be repeated can easily be determined by the skilled person without departing from the scope of the claims.

Optionally, the ammonium-exchanged molecular sieve can be subjected to heat treatment in order to decompose the ammonium ions. Subsequently, the transition metal exchange can be carried out as described above.

Incipient Wetness Impregnation

An aqueous solution of transition metal acetate, transition metal nitrate or transition metal chloride is used in a volume equal to the molecular sieve pore volume. The amount of transition metal acetate, chloride or nitrate is equal to the amount of transition metal desired in the molecular sieve. The incipient wetness impregnation is carried out at room temperature. Afterwards, the transition metal-exchanged molecular sieve is dried at temperatures from 60 to 70° C. for 8 to 16 hours, and the mixture is subsequently heated to temperatures in the range of 550 to 900° C.

Solid State Ion Exchange

Suitable transition metal salts are, for instance, transition metal acetate, transition metal nitrate, transition metal chloride, transition metal sulfate, transition metal oxide, and transition metal acetylacetonate. The transition metal salt and the molecular sieve are mixed in a dry state, and the mixture is subsequently heated to temperatures in the range of 550 to 900° C. A process for producing metal doped molecular sieves is, for instance, disclosed in US 2013/0251611 A1. This process may be applied to the molecular sieves of the present invention without departing from the scope of the claims.

Another suitable method for introducing transition metals by solid state exchange is by facilitating the exchange of the mixture of the metal precursor and the molecular sieve by the atmosphere wherein the solid state exchange is carried out. In this way the temperature of the exchange can typically be lowered. A process for introducing, e.g., copper into the molecular sieve at temperatures up to 300° C. is disclosed in WO15154828A1 wherein a mixture of copper oxide and the molecular sieve is treated in an ammonia-containing atmosphere to yield a copper exchanged molecular sieve. The features are further described in S. Shwan et al., Solid-State Ion-Exchange of Copper into Zeolites Facilitated by Ammonia at Low Temperature. *ACS Catal.* 5, 16-19 (2015).

Analogously, alkali or alkaline earth metals can be exchanged against one another or against $NH_4^+$. Suitable alkali or alkaline earth metal compounds for introducing these metals are the respective hydroxides, for instance NaOH and KOH. If the amount of alkali or alkaline earth metals shall be reduced, the molecular sieve is mixed with an aqueous $NH_4Cl$ solution and heated up to the boiling point. The molecular sieve is recovered by filtration and washing with deionized water and then dried. Repeating this procedure for one or more times further reduces the content of alkali or alkaline earth metal cations. It is also possible to perform an $NH_4^+$ wet ion exchange as described above, followed by a liquid ion exchange with other alkali or alkaline earth metal cations. Suitable alkali or alkaline earth metal salts which can be used in such a liquid ion exchange are well known to the skilled person. They comprise, for instance, the chlorides, bromides, nitrates, sulfates and acetates of lithium, sodium, potassium, rubidium, cesium, magnesium, calcium, strontium and barium, depending on the cations which are to be introduced into the final molecular sieve. It is also possible to combine exchange steps for introducing alkali or alkaline earth metals cations and transition metal cations. If both transition metal cations and alkali or alkaline earth metal cations shall be introduced, it is possible 1. to introduce the alkali or alkaline earth metal cations first, followed by the introduction of transition metal cations,
2. to introduce the transition metal cations first, followed by the introduction of alkali or alkaline earth metal cations, or
3. to introduce alkali or alkaline earth metal cations and transition metal cations concomitantly.

Which one of the three options to introduce both alkali and alkaline earth metal cations and transition metal will be chosen depends on where these cations shall be placed within the molecular sieve and which use of the molecular sieve thus obtained is intended. The skilled person knows how to find the most suitable of these three options by routine experiments. He can make use of this knowledge without leaving the scope of protection of the claims.

In one embodiment of the present invention, an $NH_4^+$ liquid ion exchange is performed first, followed by a transition metal liquid ion exchange, incipient wetness impregnation or solid state exchange Optionally, an alkali or alkaline earth metal can additionally be introduced, either prior or after the introduction of the at least one transition metal.

In another embodiment, an $NH_4^+$ liquid ion exchange is performed to reduce or to completely remove the concentration of the transition metals, the alkali metals and/or the alkaline earth metals which were introduced into the molecular sieve during the synthesis, followed by a decomposition of the $NH_4^+$ ions as described above. Furthermore, ion exchange techniques as described above can be used to reduce the concentration of one group of the metal cations, e.g. the alkali or alkaline earth metal cations, and to introduce another group of metal cations, for instance transition metal cations such as $Cu^{2+}$ and/or $Fe^{3+}$ ions, or vice versa.

Catalyzed materials may also be obtained by solid state sublimation. For this purpose, a dry, intimate mixture of the molecular sieve and a transition metal salt, preferably a copper or iron salt or a mixture of copper and iron salts, as described above under "solid state ion exchange" is made. Said mixture is then heated to a temperature of 550 to 900° C., whereby the transition metal salt decomposes into the metal (e.g. copper or iron) or the metal ion (e.g. the copper or iron ion). Subsequently, the mixture is heated at a temperature and for a time span sufficient to achieve the solid state sublimation of transition metal into the respective zeolite framework type material.

The powder thus obtained is then dispersed in water and mixed with a binder. Suitable binders are based on the oxides of Al, Zr, Ti or Si, e.g. boehmite and silica gel. Afterwards, this mixture comprising water, a binder, and the molecular sieve only needs to be stirred or homogenized, respectively, and may be applied directly as a coating suspension to coat a carrier substrate. The coating suspension is hereinafter referred to as the "washcoat".

In an alternative embodiment, the molecular sieve according to the present invention may be manufactured by adding a water-soluble transition metal salt, preferably a copper or iron salt or a mixture thereof, as described above under "liquid ion exchange", to water followed by adding this salt solution to the molecular sieve powder. A particularly suitable copper salt is copper acetate. After this liquid ion exchange, the transition containing molecular sieve framework type material thus obtained is then dispersed in water and mixed with a binder to form a washcoat as described above. Typically, the washcoat loading on a carrier substrate is in the range of between 120 and 250 g/l.

The molecular sieve which is obtained according to the method of the present invention is particularly useful in heterogeneous catalytic conversion reactions, such when the molecular sieve catalyzes the reaction of molecules in the gas phase or liquid phase. It can also be formulated for other commercially important non-catalytic applications such as separation of gases. The molecular sieve provided by the invention and from any of the preparation steps described above can be formed into a variety of physical shapes useful for specific applications. For example, the molecular sieve can be used in the powder form or shaped into pellets, extrudates or molded monolithic forms, e.g. as a full body corrugated substrate containing the molecular sieve or a honeycomb monolith. Furthermore, the molecular sieve can be present in the form of a coating on a carrier substrate, i.e. as a washcoat on a carrier substrate.

In shaping the molecular sieve, it will typically be useful to apply additional organic or inorganic components as matrix components. All inert materials which are otherwise used for the manufacturing of catalyst substrates may be used as matrix components in this context. It deals, for instance, with silicates, oxides, nitrides or carbides, with magnesium aluminum silicates being particularly preferred.

In one embodiment, the carrier substrates may be catalytically active on their own, and they may comprise catalytically active material, e.g. SCR-catalytically active material. SCR-catalytically active materials which are suitable for this purpose are basically all materials known to the skilled person, for example catalytically active materials based on mixed oxides, or catalytically active materials based on copper-exchanged, zeolitic compounds. Mixed oxides comprising compounds of vanadium, titanium and tungsten are particularly suitable for this purpose.

In one embodiment, catalytically active carrier materials are manufactured by mixing 10 to 95 wt.-% of at least one inert matrix component and 5 to 90 wt.-% of a catalytically active material, followed by extruding the mixture according to well-known protocols. As already described above, inert materials that are usually used for the manufacture of catalyst substrates may be used as the matrix components in this embodiment. Suitable inert matrix materials are, for example, silicates, oxides, nitrides and carbides, with magnesium aluminum silicates being particularly preferred. Catalytically active carrier materials obtainable by such processes are known as "extruded catalysed substrate monoliths".

The application of the catalytically active catalyst onto either the inert carrier substrate or onto a carrier substrate which is catalytically active on its own as well as the application of a catalytically active coating onto a carrier substrate, said carrier substrate comprising a molecular sieve according to the present invention, can be carried out following manufacturing processes well known to the person skilled in the art, for instance by widely used dip coating, pump coating and suction coating, followed by subsequent thermal post-treatment (calcination).

The skilled person knows that in the case of wall-flow filters, their average pore sizes and the mean particle size of the catalysts may be adjusted to one another in a manner that the coating thus obtained is located onto the porous walls which form the channels of the wall-flow filter (on-wall coating). However, the average pore sizes and the mean particle sizes are preferably adjusted to one another in a manner that the catalyst is located within the porous walls which form the channels of the wall-flow filter. In this preferable embodiment, the inner surfaces of the pores are coated (in-wall coating). In this case, the mean particle size of the catalysts has to be sufficiently small to be able to penetrate the pores of the wall-flow filter.

The molecular sieve can also be employed coated onto or introduced into a substrate that improves contact area, diffusion, fluid and flow characteristics of the gas stream. The substrate can be a metal substrate, an extruded substrate or a corrugated substrate made of ceramic paper. The carrier substrates may consist of inert materials, such as silicon carbide, aluminum titanate, cordierite, metal or metal alloys. Such carrier substrates are well-known to the skilled person and available on the market. The substrate can be designed as a flow-through or a wall-flow design. In the latter case the gas flows through the walls of the substrate, and in this way, it can also contribute with an additional filtering effect.

The molecular sieve is typically present on or in the substrate in amounts from about 10 to about 600 g/L, preferably about 100 to about 300 g/L, as calculated by the weight of the molecular sieve per volume of the total catalyst article.

The molecular sieve can be coated on or into the substrate using known wash-coating techniques. In this approach the molecular sieve powder is suspended in a liquid medium together with binder(s) and stabilizer(s). The wash coat can then be applied onto the surfaces and walls of the substrate. The wash coat optionally also contains binders based on $TiO_2$, $SiO_2$, $Al_2O_3$, $ZrO_2$, $CeO_2$ and combinations thereof.

The molecular sieve can also be applied as one or more layers on the substrate in combination with other catalytic functionalities or other molecular sieve catalysts. One specific combination is a layer with an oxidation catalyst containing, for example, platinum or palladium or combinations thereof. The molecular sieve can be additionally applied in limited zones along the gas-flow-direction of the substrate.

The molecular sieves prepared according to the present invention may advantageously be used for the exhaust purification of lean combustion engines, in particular for diesel engines. They convert nitrogen oxides comprised in the exhaust gas into the harmless compounds nitrogen and water.

The molecular sieve prepared according to the invention can be used in the catalytic conversion of nitrogen oxides, typically in the presence of oxygen. In particular, the molecular sieve can be used in the selective catalytic reduction (SCR) of nitrogen oxides with a reductant such as ammonia and precursors thereof, including urea, or hydrocarbons. For this type of application, the molecular sieve will typically be loaded with a transition metal such as copper or iron or combinations thereof, using any of the procedures described above, in an amount sufficient to catalyze the specific reaction.

Commonly known exhaust gas purification systems for diesel engines are often formed by arranging an oxidation catalyst (DOC) having an oxidative function for carbon monoxide and hydrocarbons and optionally nitrogen monoxide and aforementioned selective catalytic reduction type catalyst (SCR), in a flow path of exhaust gas, characterized in that a spraying means to supply an urea aqueous solution or an aqueous ammonia solution or gaseous ammonia is arranged downstream of the aforementioned oxidation catalyst and upstream of aforementioned selective catalytic reduction type catalyst. The skilled person knows that the DOC catalyst might also be replaced by a passive NOx adsorber catalyst (PNA) or $NO_x$ storage catalyst (NSC) which is able to store NOx from the exhaust gas at lower temperatures and to desorb the $NO_x$ thermally at higher temperatures (PNA) or reduce the NOx directly by means of a reductant like rich exhaust gas (Lambda<1) or other reducing agents like fuel (NSC), respectively. The PNA or NSC catalysts preferably also contain catalytic functions for the oxidation of carbon monoxide and hydrocarbons as well as optionally the oxidation of nitrogen monoxide. Furthermore, a diesel particulate filter (DPF) for filtering out soot is often arranged in the system together with the DOC (or NSC) catalyst and the SCR catalyst. In these arrangements, combustible particle components are deposited on the DPF and combusted therein. Such arrangements are, for instance, disclosed in EP 1 992 409 A1. Widely used arrangements of such catalysts are, for example (from upstream to downstream):

(1) DOC+($NH_3$)+SCR
(2) DOC+DPF+($NH_3$)+SCR
(3) DOC+($NH_3$)+SCR+DPF
(4) DOC+($NH_3$)+SCR+DOC+DPF
(5) DOC+($NH_3$)+SDPF+($NH_3$ opt.)+SCR
(6) DOC+CDPF+($NH_3$)+SCR
(7) ($NH_3$)+SCR+DOC+CDPF ($NH_3$ opt.)+SCR
(8) ($NH_3$)+SCR+DOC+SDPF+($NH_3$ opt.)+SCR
(9) ($NH_3$)+SCR+ASC
(10) DOC+($NH_3$)+SCR+SDPF+($NH_3$ opt.)+SCR
(11) DOC+($NH_3$)+SDPF+SCR+($NH_3$ opt.)+SCR (SDPF: Diesel particulate filter (DPF) coated with an SCR catalyst
CDPF: Catalysed Diesel particulate filter=DPF coated with a DOC)

In the above examples (1) to (11), ($NH_3$) represents a position where an urea aqueous solution, an aqueous ammonia solution, ammonium carbamate, ammonium formiate or another reducing agent reducing $NO_x$ via the SCR reaction selectively is supplied as a reducing agent by spraying. The supply of such urea or ammonia compounds in automotive exhaust gas purification systems is well known in the art. ($NH_3$ opt.) in examples 5, 7, 8, 10 and 11 means that said second source of urea or ammonia compounds is optional. The catalysts containing the molecular sieve according to the present invention are preferably positioned close to the engine or close to the DPF, since here the temperatures are highest in the system. Preferably the molecular sieves of the present invention are used on the SDPF or catalysts closely positioned to the filter like in system 10 and 11 where one SCR catalyst is located directly upstream or downstream the SDPF, respectively without additional $NH_3$ dosing in-between these two catalysts. Also the first SCR catalyst of systems 7 to 9 which is close coupled to the engine is a preferred embodiment of the present invention.

Hence, the present invention furthermore refers to a method for the purification of exhaust gases of lean combustion engines, characterized in that the exhaust gas is passed over a catalyst according to the present invention. Lean combustion engines are diesel engines, which are generally operated under oxygen rich combustion conditions, but also gasoline engines which are partly operated under lean (i.e. oxygen rich atmosphere with Lambda>1) combustion conditions. Such gasoline engines are, for instance, lean GDI engines or gasoline engines which are using the lean operation only in certain operation points of the engine like cold start or during fuel cut events. Due to the high thermal stability of the molecular sieves according to the present invention these molecular sieves might also be used in exhaust systems of gasoline engines. In this case a PNA, SCR or ASC catalyst might be arranged in combination with aftertreatment components typically used to clean exhaust emissions from gasoline engines like three way catalysts (TWC) or gasoline particulate filters (GPF). In these cases, the above mentioned system lay outs 1 to 11 are modified by replacing the DOC catalyst by a TWO catalyst and the DPF or CDPF by a GPF. In all those systems the dosing of ammonia is optional since gasoline engines are able to produce ammonia in situ during operation over the TWC catalyst so that the injection of aqueous urea or ammonia or another ammonia precursor upstream of the SCR catalyst might not be needed. In case a PNA is used in those systems, the PNA will preferably be located as a first catalyst in the system close to the engine to have an early heat up. The PNA might also be located in an under-floor position to prevent thermal damage of the catalyst. In these positions the exhaust temperatures can be controlled in order to not exceed 900° C.

In a preferred embodiment, ammonia is used as the reducing agent. The ammonia required may, for instance, be formed within the exhaust purification system upstream to a particulate filter by means of an upstream nitrogen oxide storage catalyst ("lean $NO_x$ trap"—LNT). This method is known as "passive SCR".

Alternatively, ammonia may be supplied in an appropriate form, for instance in the form of urea, ammonium carbamate or ammonium formiate, and added to the exhaust gas stream as needed. A widespread method is to carry along an aqueous urea solution and to and to dose it into the catalyst according to the present invention via an upstream injector as required.

The present invention thus also refers to a system for the purification of exhaust gases emitted from lean combustion engines, characterized in that it comprises a catalyst comprising the molecular sieve according to the present invention, preferably in the form of a coating on a carrier substrate or as a component of a carrier substrate, and an injector for aqueous urea solutions.

For example, it is known from SAE-2001-01-3625 that the SCR reaction with ammonia proceeds more rapidly if the nitrogen oxides are present in a 1:1 mixture of nitrogen monoxide and nitrogen dioxide, or if the ratios of both nitrogen oxides are close to 1:1. As the exhaust gas from lean combustion engines generally contains an excess of nitrogen monoxide over nitrogen dioxide, this SAE paper suggests to increase the amount of nitrogen dioxide by means of an oxidation catalyst. The exhaust gas purification process according to the present invention may not only be applied in the standard SCR reaction, i.e. in the absence of nitrogen oxide, but also in the rapid SCR reaction, i.e. when part of the nitrogen monoxide has been oxidized to nitrogen dioxide, thus ideally providing a 1:1 mixture of nitrogen monoxide and nitrogen dioxide.

The present invention therefore also relates to a system for the purification of exhaust gases from lean combustion engines, characterized in that it comprises an oxidation catalyst, an injector for aqueous urea solutions and a catalyst comprising the molecular sieve according to the present invention, preferably in the form of a coating on a carrier substrate or as a component of a carrier substrate.

In a preferred embodiment of the exhaust gas purification system according to the present invention, platinum supported on a carrier support material is used as an oxidation catalyst.

Any carrier material for platinum and/or palladium which is known to the skilled person as suitable material may be used without departing from the scope of the claims. For example, these materials show a BET surface area of about 30 to about 250 $m^2/g$, preferably about 50 to about 200 $m^2/g$ (measured according to DIN 66132). Preferred carrier substrate materials are alumina, silica, magnesium dioxide, titanic, zirconia, ceria and mixtures and mixed oxides comprising at least two of these oxides. Particularly preferred materials are alumina and alumina/silica mixed oxides. If alumina is used, it is preferably stabilized, for instance with lanthanum oxide.

The exhaust gas purification system is arranged in an order wherein, in flow direction of the exhaust gas purification system, an oxidation catalyst is arranged first, followed by an injector for an aqueous urea solution, and finally a catalyst comprising the molecular sieve according to the present invention.

The skilled person knows that the exhaust gas purification system may comprise additional catalysts. A particulate filter may, for instance, be coupled with either the DOC, thus forming a CDPF, or with an SCR, thus forming an SDPF.

In one embodiment of the present invention, the exhaust gas purification system comprises a particulate filter coated with an SCR catalyst, wherein the SCR catalytically active material is a molecular sieve according to the present invention.

The molecular sieve according to the present invention can be coated into the walls of the filter (wall flow substrate) or on the surface of the filter walls. Also a combination of in-wall-coating and on-wall-coating is possible. The wall flow filter can be coated over the whole length of the filter or only partly from the inlet or from the outlet with the molecular sieve according to the present invention. Methods to apply a molecular sieve on such a filter are disclosed in WO 2017/178576 A1, WO 2018/029330 A1 and WO 2018/054928 A1. These methods are incorporated by reference.

Furthermore, the exhaust gas purification system may comprise a PNA. The PNA is a $NO_x$ storage device that adsorbs $NO_x$ at low temperatures. Once the exhaust temperatures increases, the stored $NO_x$ is released and reduced to nitrogen over a downstream catalyst, i.e. an SCR catalyst using ammonia, usually in the form of an aqueous urea solution, or an active, barium-based NSC. An NSC is a $NO_x$ storage catalyst.

In some PNA type catalysts, a combination of precious metals and molecular sieves is used for $NO_x$ trapping. The precious metal is a platinum group metal selected from ruthenium, rhodium, palladium, osmium, iridium, platinum and mixtures thereof. Preferably, the precious metal is chosen from palladium, platinum and mixtures thereof, more preferably, the precious metal is palladium. The total amount of the platinum group metal or the mixture is present in a concentration of about 0.01 to about 10 wt.-%, preferably about 0.05 to about 5 wt.-%, even more preferably about 0.1 to about 3 wt.-%, calculated as the respective platinum group metal and based on the total weight of the molecular sieve. In a preferred embodiment, the platinum group metal is palladium, and it is present in a concentration of about 0.5 to about 5 wt.-%, calculated as Pd and based on the total weight of the molecular sieve. In such a PNAs, the $NO_x$ trapping efficiency is influenced by the nuclearity and the oxidation state of Pd. The dispersion and lower oxidation states of Pd facilitate $NO_x$ adsorption. The $NO_x$ release temperature is dependent on the molecular sieve structure and is higher for small pore molecular sieves and lowest for large pore molecular sieves.

In one embodiment of the present invention, the exhaust purification system comprises a PNA catalyst, wherein the PNA catalytically active material comprises a molecular sieve according to the present invention and at least one precious metal selected from palladium, platinum, and mixtures thereof.

The platinum group metals may be introduced into the PNA via ion exchange of suitable PGM precursor salts as described above or via incipient wetness impregnation treatment of the molecular sieve or via injection of a PGM salt solution into an aqueous washcoat slurry. The skilled person knows that suitable precious metal precursor salts are the nitrates, acetates, sulfates and amine type complexes of the respective precious metals. He can apply this knowledge without departing from the scope of the claims.

The exhaust gas purification system may furthermore comprise an ammonia oxidation catalyst (ASC). It is well known to the skilled person that an ASC is preferably located downstream of the SCR, because recognizable amounts of $NH_3$ leave the SCR due to the dynamic driving conditions. Therefore, the conversion of excess ammonia which leaves the SCR is mandatory, since ammonia is also an emission regulated gas. Oxidation of ammonia leads to the formation of NO as main product, which would consequently contribute negatively to the total conversion of $NO_x$ of the whole exhaust system. An ASC may thus be located downstream the SCR to mitigate the emission of additional NO. The ASC catalyst combines the key $NH_3$ oxidation function with an SCR function. Ammonia entering the ASC is partially oxidized to NO. The freshly oxidized NO and $NH_3$ inside the ASC, not yet oxidized, can consequently react to $N_2$ following the usual SCR reaction schemes. In doing so, the ASC is capable of eliminating the traces of ammonia by converting them in a parallel mechanism to $N_2$.

In one embodiment of the present invention, the exhaust purification system comprises an ASC catalyst, wherein the ASC catalytically active material comprises a molecular sieve according to the present invention and at least one platinum group metal selected from platinum, palladium and mixtures thereof.

Platinum group metals are used as oxidation catalysts in an ASC, and molecular sieves may be used for the SCR function. The precious metal is a platinum group metal selected from ruthenium, rhodium, palladium, osmium, iridium, platinum and mixtures thereof. Preferably, the precious metal is chosen from palladium, platinum, rhodium and mixtures thereof, more preferably, the precious metal is platinum. In a preferred embodiment, the platinum group metal is added in the form of a precursor salt to a washcoat slurry and applied to the carrier monolith. The platinum group metal is present in a concentration of about 0.01 to about 10 wt.-%, preferably about 0.05 to about 5 wt.-%, even more preferably about 0.1 to about 3 wt.-%, calculated as the respective platinum group metal and based on the total weight of the washcoat loading. In a preferred embodiment, the platinum group metal is platinum, and it is present in a concentration of about 0.1 to about 1 wt.-%, calculated as Pt and based on the total weight of washcoat loading.

The most commonly applied components for the oxidation of ammonia by oxygen are based on metals like Pt, Pd, Rh, Ir, and Ru, but transition metal oxides or a combination of metal oxides, for example, oxides of Ce, Ti, V, Cr, Mn, Fe, Co, Nb, Mo, Ta, or W can also be used for this purpose. When such materials are combined with metal-loaded form of the molecular sieve having SCR activity, an ammonia slip catalyst is obtained.

Ammonia slip catalysts based on the molecular sieve prepared according to the invention may also contain auxiliary materials, for example, and not limited to binders, support materials for the noble metal components, such as $Al_2O_3$, $TiO_2$, and $SiO_2$. Such combinations can have different forms, such as a mixture of the ammonia oxidation component with the SCR-active form of the molecular sieve prepared according to the invention, reactors or catalyst items in series (see for example U.S. Pat. No. 4,188,364).

In particular, the ammonia slip catalyst can be a washcoated layer of a mixture of the ammonia oxidation component with the SCR-active form of the molecular sieve on a monolith, or a multi-layered arrangement washcoated on a monolith, in which the different layers contain different amounts of the ammonia oxidation component, or of the SCR-active form of the molecular sieve, or of any combination of the ammonia oxidation component and the SCR-active form of the molecular sieve of the invention (cf. e.g., JP 3436567, EP 1 992 409).

In another configuration, the ammonia oxidation component or the SCR-active form of the molecular sieve or any combination of the ammonia oxidation component and the SCR-active form of the molecular sieve is present in the walls of a monolith. This configuration can further be combined with different combinations of washcoated layers.

Another configuration of the ASC catalyst is a catalyst article with an inlet end and an outlet end, in which the inlet end contains an ammonia oxidation component, or SCR-active form of the molecular sieve, or any combination of the ammonia oxidation component and SCR-active form of the molecular sieve that is different from the ammonia oxidation component, or SCR-active form of the molecular sieve, or any combination of the ammonia oxidation component and SCR-active form of the molecular sieve at the outlet end.

The molecular sieve prepared according to the invention is useful as catalyst in the reduction of nitrogen oxides in the exhaust gas from a gas turbine using ammonia as a reductant. In this application, the catalyst may be arranged directly downstream from the gas turbine. It may also be exposed to large temperature fluctuations during gas turbine start-up and shut-down procedures.

In certain applications, the molecular sieve catalyst is used in a gas turbine system with a single cycle operational mode without any heat recovery system down-stream of the turbine.

When placed directly after the gas turbine the molecular sieve is able to withstand exhaust gas temperatures up to 650° C. with a gas composition containing water.

Further applications of the molecular sieve are in a gas turbine exhaust treatment system in combination with a heat recovery system such as a Heat Recovery System Generator (HRSG). In such a process design, the molecular sieve catalyst is arranged between the gas turbine and the HRSG. The molecular sieve can be also arranged in several locations inside the HRSG.

Still another application of the molecular sieve is the employment as a catalyst in combination with an oxidation catalyst for the abatement of hydrocarbons and carbon monoxide in exhaust gas.

The oxidation catalyst, typically containing platinum group metals, such as Pt and Pd, can e.g. be arranged either up-stream or down-stream of the molecular sieve and both inside and outside of the HRSG. The oxidation functionality can also be combined with the molecular sieve catalyst into a single catalytic unit.

The oxidation functionality may be combined directly with the molecular sieve by using the molecular sieve as a support for the platinum group metals. The platinum group metals can also be supported onto another support material and physically mixed with the molecular sieve.

The molecular sieve is capable of removing nitrous oxide. It can for example be arranged in combination with a nitric acid production loop in a primary, secondary or a tertiary abatement setup. In such an abatement process, the molecular sieve can be used to remove nitrous oxide as well as nitrogen oxides as separate catalytic articles or combined into a single catalytic article. The nitrogen oxide may be used to facilitate the removal of the nitrous oxide. Ammonia or lower hydrocarbons, including methane, may also be added as a reductant to further reduce nitrogen oxides and/or nitrous oxide.

The molecular sieve can also be used in the conversion of oxygenates into various hydrocarbons. The feedstock of oxygenates is typically lower alcohols and ethers containing one to four carbon atoms and/or combinations thereof. The oxygenates can also be carbonyl compounds such as aldehyde, ketones and carboxylic acids. Particularly suitable oxygenate compounds are methanol, dimethyl ether, and mixtures thereof. Such oxygenates can be converted into hydrocarbons in presence of the molecular sieve. In such a process the oxygenate feedstock is typically diluted and the temperature and space velocity is controlled to obtain the desired product range.

A further use of the molecular sieve is as a catalyst in the production of lower olefins, in particular olefins suitable for use in gasoline or as a catalyst in the production of aromatic compounds.

In the above applications, the molecular sieve is typically used in its acidic form and will be extruded with binder materials or shaped into pellets together with suitable matrix and binder materials as described above.

Other suitable active compounds such as metals and metal ions may also be included to change the selectivity towards the desired product range.

The molecular sieve can further be used in the partial oxidation of methane to methanol or other oxygenated compounds such as dimethyl ether.

One example of a process for the direct conversion of methane into methanol at temperatures below 300° C. in the gas phase is provided in WO 11046621 A1. In such a process, the molecular sieve is loaded with an amount of copper sufficient to carry out the conversion. Typically, the molecular sieve will be treated in an oxidizing atmosphere where-after methane is subsequently passed over the activated molecular sieve to directly form methanol. Subsequently, methanol can be extracted by suitable methods and the active sites can be regenerated by another oxidative treatment.

Another example is disclosed in [K. Narsimhan, K. Iyoki, K. Dinh, Y. Roman-Leshkov, *ACS Cent. Sci.* 2016, 2, 424-429] where an increase or a continuous production of methanol is achieved by addition of water to the reactant stream to continuously extract methanol without having to alter the conditions between oxidative treatments and methanol formation.

The molecular sieve can be used to separate various gasses. Examples include the separation of carbon dioxide from natural gas and lower alcohols from higher alcohols. Typically, the practical application of the molecular sieve will be as part of a membrane for this type of separation.

The molecular sieve can further be used in isomerization, cracking hydrocracking and other reactions for upgrading oil.

The molecular sieve may also be used as a hydrocarbon trap e.g. from cold-start emissions from various engines.

Furthermore, the molecular sieve can be used for the preparation of small amines such as methylamine and dimethylamine by reaction of ammonia with methanol.

The present invention is illustrated by the following examples which should not be construed as limiting.

EXAMPLES

Example 1

A non-molecular sieve source of Si and Al was prepared by co-precipitation of silica and alumina from sodium silicate and aluminium nitrate using nitric acid to give an amorphous silica-alumina.

A mixture of tetraethylammonium hydroxide (TEAOH), FAU zeolite ($SiO_2/Al_2O_3=30$), amorphous silica-alumina (ASA) ($SiO_2/Al_2O_3=10$) and water was prepared to give a reaction mixture with a composition having the molar ratios 1 $SiO_2$ (45% ASA and 55% FAU):0.048 $Al_2O_3$:0.2 TEAOH: 0.2 NaOH:20$H_2O$. The reaction mixture was crystallized in a closed Teflon lined autoclave at 150° C. for two days and the solid product was separated by filtration and afterwards washed with deionized water. The solid product was characterized by X-ray diffraction showing that the product was CHA essentially without any stacking disorder. The as-prepared material was calcined in air at 550° C. for 4 h in order to eliminate the occluded organic species.

Example 2

A mixture of tetraethylammonium hydroxide (TEAOH), tetraethylammonium bromide (TEABr), sodium hydroxide, FAU zeolite ($SiO_2/Al_2O_3=30$), amorphous silica-alumina (ASA) ($SiO_2/Al_2O_3=16$) and water was prepared to give a reaction mixture with a composition having the molar ratios 1 $SiO_2$ (70% ASA and 30% FAU):0.05 $Al_2O_3$:0.3 TEAOH: 0.5 TEABr:0.2 NaOH:9$H_2O$. The reaction mixture was crystallized in a closed Teflon lined autoclave at 120° C. for five days and the solid product was separated by filtration and afterwards washed with deionized water. The solid product was characterized by X-ray diffraction showing that the product was CHA essentially without stacking disorder. The composition of the solid product was measured by ICP giving a $SiO_2/Al_2O_3=15.4$. The as-prepared material was calcined in air at 550° C. for 4 h in order to eliminate the occluded organic species.

Example 3

A mixture of tetraethylammonium hydroxide (TEAOH), tetraethylammonium bromide (TEABr), copper tetraethylenepentamine (Cu-TEPA), sodium hydroxide, FAU zeolite ($SiO_2/Al_2O_3$=30), amorphous silica-alumina (ASA) ($SiO_2/Al_2O_3$=16) and water was prepared to give a reaction mixture with a composition having the molar ratios 1 $SiO_2$ (70% ASA and 30% FAU):0.05 $Al_2O_3$:0.025 Cu-TEPA:0.3 TEAOH:0.5 TEABr:0.2 NaOH:9$H_2O$. The reaction mixture was crystallized in a closed Teflon lined autoclave at 120° C. for five days and the solid product was separated by filtration and afterwards washed with deionized water. The solid product was characterized by X-ray diffraction showing that the product was CHA essentially without any stacking disorder. The composition of the solid product was measured by ICP giving a $SiO_2/Al_2O_3$=14.8 and 2.3 wt. % Cu. The as-prepared material was calcined in air at 550° C. for 4 h in order to eliminate the occluded organic species.

Example 4

A number of other synthesis mixtures were prepared in a similar manner as described in Examples 1 to 3 using tetraethylammonium as the OSDA. The composition of the synthesis mixtures together with the crystallization conditions and product characteristics are shown in Table 1 together with results from Examples 1 to 3.

Example 5

A non-molecular sieve source of Si and Al with a $SiO_2/Al_2O_3$ of 13.4 was prepared by co-precipitation of silica and alumina from sodium silicate and aluminium nitrate using nitric acid to give an amorphous silica-alumina.

A mixture of triethylmethylammonium hydroxide (TEMAOH), sodium hydroxide, FAU zeolite ($SiO_2/Al_2O_3$=30), amorphous silica-alumina (ASA) ($SiO_2/Al_2O_3$=13.4) and water was prepared to give a reaction mixture with a composition having the molar ratios 1 $SiO_2$ (70% ASA and 30% FAU):0.06 $Al_2O_3$:0.29 TEMAOH:0.21 NaOH:9.0$H_2O$. The reaction mixture was crystallized in a closed Teflon lined autoclave at 120° C. for five days and the solid product was separated by filtration and afterwards washed with deionized water. The characterization by PXRD reveals the crystallization of the CHA material, which is essentially free of stacking disorder. The as-prepared material was calcined in air at 550° C. for 4 h in order to eliminate the occluded organic species.

Example 6

A mixture of tetraethylammonium hydroxide (TEAOH), sodium hydroxide, FAU zeolite ($SiO_2/Al_2O_3$=12), sodium silicate (Na-Sil) ($SiO_2/Al_2O_3$=∞) and water was prepared to give a reaction mixture with a composition having the molar ratios 1 $SiO_2$ (25% NaSil and 75% FAU):0.06 $Al_2O_3$:0.40 TEAOH:0.20 NaOH:18$H_2O$. The reaction mixture was crystallized in a closed Teflon lined autoclave at 165° C. for five days and the solid product was separated by filtration and afterwards washed with deionized water. The characterization by PXRD reveals the crystallization of the CHA material essentially free of stacking disorder. The as-prepared material was calcined in air at 550° C. for 4 h in order to eliminate the occluded organic species.

In the table "SAR" is the abbreviation for $SiO_2/Al_2O_3$, "ASA" is the abbreviation for amorphous silica-alumina and "Na-Sil" is the abbreviation for sodium silicate.

From the results it can be seen that when the hydroxide to silica ratio is <0.6 in the synthesis mixture essentially no stacking disorder is observed in the solid product.

| | Synthesis mixture | | | | | Amount ASA | | | Product characteristics | |
|---|---|---|---|---|---|---|---|---|---|---|
| Ex | $SiO_2/Al_2O_3$ | OSDA/$SiO_2$ | NaOH/$SiO_2$ | $H_2O$/$SiO_2$ | Al / Si-source | (Si(from ASA) / Total Si) | OH / Si | Crystallization | Phase | Stacking disorder (%) |
| | | | | | Reaction mixtures giving products with stacking disorder | | | | | |
| 4a | 16 | 0.40 | 0.30 | 20 | FAU (SAR = 16) | 0% | 0.7 | 150° C., 2 days | CHA-GME | 40 |
| 4b | 16 | 0.30 | 0.40 | 20 | FAU (SAR = 16) | 0% | 0.7 | 150° C., 2 days | CHA-GME | 70 |
| 4c | 30 | 0.50 | 0.20 | 25 | FAU (SAR = 30) | 0% | 0.7 | 140° C., 7 days | CHA-GME | 5 |
| 4d | 21 | 0.30 | 0.40 | 20 | FAU (SAR = 30) ASA (SAR = 10) | 45% | 0.7 | 150° C., 2 days | CHA-GME | 50 |
| | | | | | Reaction mixtures giving products without stacking disorder | | | | | |
| 1 | 21 | 0.20 | 0.20 | 20 | FAU (SAR = 30) ASA (SAR = 10) | 45% | 0.4 | 150° C., 2 days | CHA | ~0 |
| 2 | 20 | 0.80 | 0.20 | 9 | FAU (SAR = 30) ASA (SAR = 16) | 70% | 0.5 | 120° C., 5 days | CHA | ~0 |
| 4e | 21 | 0.20 | 0.20 | 20 | FAU (SAR = 30) ASA (SAR = 10) | 45% | 0.4 | 150° C., 2 days | CHA | ~0 |
| 4f | 20 | 0.40 | 0.20 | 9 | FAU (SAR = 30) ASA (SAR = 16) | 70% | 0.5 | 120° C., 5 days | CHA | ~0 |
| 5 | 17 | 0.29 | 0.21 | 9.0 | FAU (SAR = 30) ASA (SAR = 13.4) | 70% | 0.50 | 120° C., 5 days | CHA | ~0 |
| 6 | 16 | 0.20 | 0.40 | 18 | FAU (SAR = 12) Na-Sil | 25% | 0.60 | 165° C., 5 days | CHA | ~0 |

The invention claimed is:

1. A method for the preparation of a molecular sieve of the CHA-type having an amount of stacking disorder of up to 4%, wherein the method comprises the steps of:
   (i) preparing a synthesis mixture comprising
      (a) a non-molecular sieve source of both silicon and aluminum selected from the group consisting of precipitated silica-alumina, amorphous silica-alumina, kaolin, and mixtures thereof;
      (b) an organic structure directing agent (OSDA) which is a tetraethylammonium cation, a methyltriethylammonium cation, or a mixture thereof;

(c) water;
(d) a crystalline molecular sieve containing six-ring structural features is selected from FAU; and
(e) an alkali hydroxide (A) which is sodium hydroxide;
in molar ratios of
$SiO_2/Al_2O_3$ 8 to 60
$OSDA/SiO_2$ 0.01 to 1.0
water/$SiO_2$ 2 to 200
$A/SiO_2$ more than 0 and up to 0.25;
wherein the molar ratio of (the total amount of non-molecular sieve source of silicon and non-molecular sieve source of aluminum) to (crystalline molecular sieve containing six-ring structural features) is in the range of 99/1 to 5/95, and wherein the ratio of total hydroxide to silica is below or equal to 0.6;
(ii) subjecting the mixture to conditions capable of crystallizing the molecular sieve of the CHA-type; and
(iii) separating the molecular sieve of the CHA-type.

2. The method of claim 1, wherein the OSDA is the tetraethylammonium cation.

3. The method of claim 1, wherein the synthesis mixture further comprises copper tetraethylene pentamine.

4. The method of claim 1, wherein the synthesis mixture further comprises a seed crystal of the CHA-type.

5. The method of claim 4, wherein the amount of seed crystal corresponds to 0.1 to 25 weight-% based on the total amount of silica in the synthesis mixture.

6. The method of claim 1, comprising the further step of removing the OSDA from the molecular sieve of the CHA-type by calcination.

7. The method of claim 1, wherein the method comprises the further step of removing alkali from the molecular sieve of the CHA-type by ion-exchange with ammonium and/or hydrogen.

8. The method of claim 1, comprising the further step of introducing a metal ion into and/or on the molecular sieve of the CHA-type by ion-exchange, impregnation, a solid-state procedure or precipitation on the surface of the molecular sieve of the CHA-type.

9. The method according to claim 8, wherein the metal ion is copper and/or iron.

10. The method according to claim 1, wherein the molar ratio of the alkali hydroxide (A) to $SiO_2$ is more than 0 and up to 0.2.

* * * * *